(12) United States Patent
Hackett

(10) Patent No.: US 7,073,248 B2
(45) Date of Patent: Jul. 11, 2006

(54) RESIN FIXTURE FOR INSULATING AN ELECTRIC MOTOR STATOR

(75) Inventor: William F. Hackett, Mesa, AZ (US)

(73) Assignee: William Franklin Hackett, Jr., Chandler, AZ (US)

( * ) Notice: Subject to any disclaimer, the term of this patent is extended or adjusted under 35 U.S.C. 154(b) by 0 days.

(21) Appl. No.: 10/338,789

(22) Filed: Jan. 7, 2003

(65) Prior Publication Data

US 2004/0128824 A1    Jul. 8, 2004

(51) Int. Cl.
*H02K 15/00* (2006.01)
*H02K 15/14* (2006.01)
*H02K 15/16* (2006.01)

(52) U.S. Cl. .................. 29/596; 29/732; 29/734; 116/210; 141/313; 428/626

(58) Field of Classification Search .................. 29/596, 29/732, 734; 428/626; 141/313; 116/210
See application file for complete search history.

(56) References Cited

U.S. PATENT DOCUMENTS

| 3,692,071 | A | * | 9/1972 | Begleiter ..................... 141/313 |
| 4,872,414 | A | * | 10/1989 | Asquith et al. .............. 116/210 |
| 6,190,598 | B1 | * | 2/2001 | Murphy et al. .............. 264/314 |
| 6,622,759 | B1 | * | 9/2003 | Yang ........................... 141/114 |

* cited by examiner

*Primary Examiner*—A. Dexter Tugbang
*Assistant Examiner*—Tim Phan
(74) *Attorney, Agent, or Firm*—Townsend and Townsend and Crew LLP

(57) ABSTRACT

A resin fixture that is inserted into a stator for an electric motor for a pump for the purpose of insulating the stator with resin. The resin fixture includes a rubber cover that is inflated. The fixture thereby prevents the stator bore from filling with resin.

7 Claims, 2 Drawing Sheets

RESIN FIXTURE FOR INSULATING AN ELECTRIC MOTOR STATOR

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

1. Field of the Invention

The present invention pertains to systems and methods using a balloon fixture for insulating an electric motor stator, and more particularly, to systems and methods for insulating the stator of a submersible electric motor.

2. Description of the Prior Art

Stator assemblies that are constructed for submersible motors need to be insulated. However, standard methods for insulating electric motor stator assemblies have quality control problems. Generally, the stator assemblies that are constructed for submersible motors require a steel sleeve be placed inside the stator bore. The purpose of the sleeve is to confine the resin pour, thereby keeping the resin from filling the bore. The stator must be covered with resin, void of air pockets and completely cover the magnetic wire coils. However, the presence of the sleeve hinders the induction of current into the rotor coil or bar. Rotors constructed with a bore sleeve operate less efficiently than one constructed without such a bore sleeve.

Additionally, C.S.A.-UL regulations often require motors to pass a high pot test with the motor in salt water. The requirements for this test include that the motor be charged with 1,500 volts at 0.005 amps for one minute. The test is performed with salt water inside the motor. The motor is run for one hour and the salt concentration needs to be 300 ohms per centimeter. Unfortunately, the majority of submersible electric motors manufactured cannot pass this test.

SUMMARY OF THE INVENTION

The present invention provides a method of insulating an electric motor stator for a pump with resin. The method includes providing a resin fixture comprising a tube that includes longitudinally spaced holes, a first plug at a first end, and a second plug at a second end. The second plug includes a valve. A rubber cover is placed over the tube. The method further includes placing the resin fixture inside the stator's bore, placing a first end plug at a first end of the stator and a second end plug at a second end of the stator, and placing an outer cover around the stator and between the end plugs. A first inner spacer ring is placed at the first end of the stator and a second inner spacer ring is placed at the second end of the stator. The inner spacer rings are placed between lead wires of the stator and the resin fixture adjacent the first and second end plugs. A first outer spacer ring is placed at the first end of the stator and a second outer spacer ring is placed at the second end of the stator. The outer spacer rings are placed between lead wires of the stator and the outer cover adjacent the first and second end plugs. The rubber cover is inflated through the valve and resin is moved over the stator.

In accordance with one aspect of the present invention, the outer cover comprises plastic tape wrapped around the stator between the end plugs.

In accordance with another aspect of the present invention, the outer cover comprises a mold that comprises a rigid material between the end plugs.

In accordance with a further aspect of the present invention, the tube comprises metal.

In accordance with yet another aspect of the present invention, the resin is moved over the stator via a vacuum pump coupled to a hole defined in one of the outer spacer rings.

In accordance with a further aspect of the present invention, the resin is moved over the stator via a pressure pump coupled to a hole defined in one of the outer spacer rings.

In accordance with another aspect of the present invention, the end plugs are coupled to one another with support bolts.

Accordingly, the present invention provides a method and apparatus for coating a stator with resin. By inflating the balloon inside the stator bore, the bore does not fill with resin. Thus, stators manufactured in this manner generally pass the required pot test for the submersible electric motor.

Other features and advantages of the present invention will be understood upon reading the following detailed description in conjunction with the included drawings.

DETAILED DESCRIPTION OF SPECIFIC EXEMPLARY EMBODIMENTS OF THE PRESENT INVENTION

Figure 1:
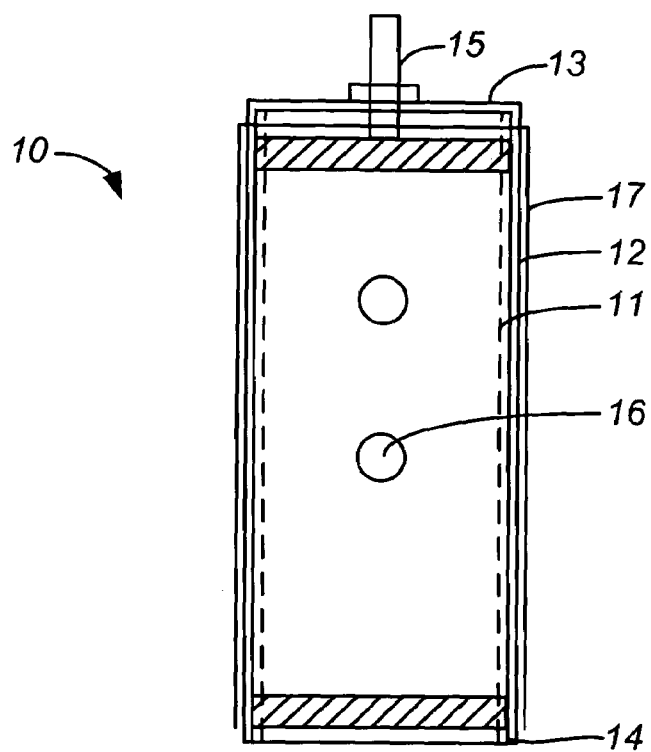
FIG. 1 is an elevation view of a resin fixture in accordance with the present invention.

FIG. 1 illustrates a resin fixture 10 for use with the present invention. The resin fixture includes a tube 11, preferably made of metal, with a rubber cover 12 placed over it. The rubber cover is preferably fastened at each end with cement. The tube includes a plug 13, 14 in each end. One plug includes a valve 15, which, in a preferred embodiment, is a Schrader valve. The metal tube also includes holes 16 that are preferably evenly spaced along the length. While only two holes are illustrated, those skilled in the art will understand that more or less may be used as desired. Preferably, a sheet of Teflon 17 is placed over the rubber cover.

Thus, in order to inflate the rubber cover or "balloon," air is provided to valve 15 and thus exits holes 16 defined within tube 11. This inflates the rubber cover outwardly. The holes help disperse air pressure inside the balloon evenly.

Figure 2:
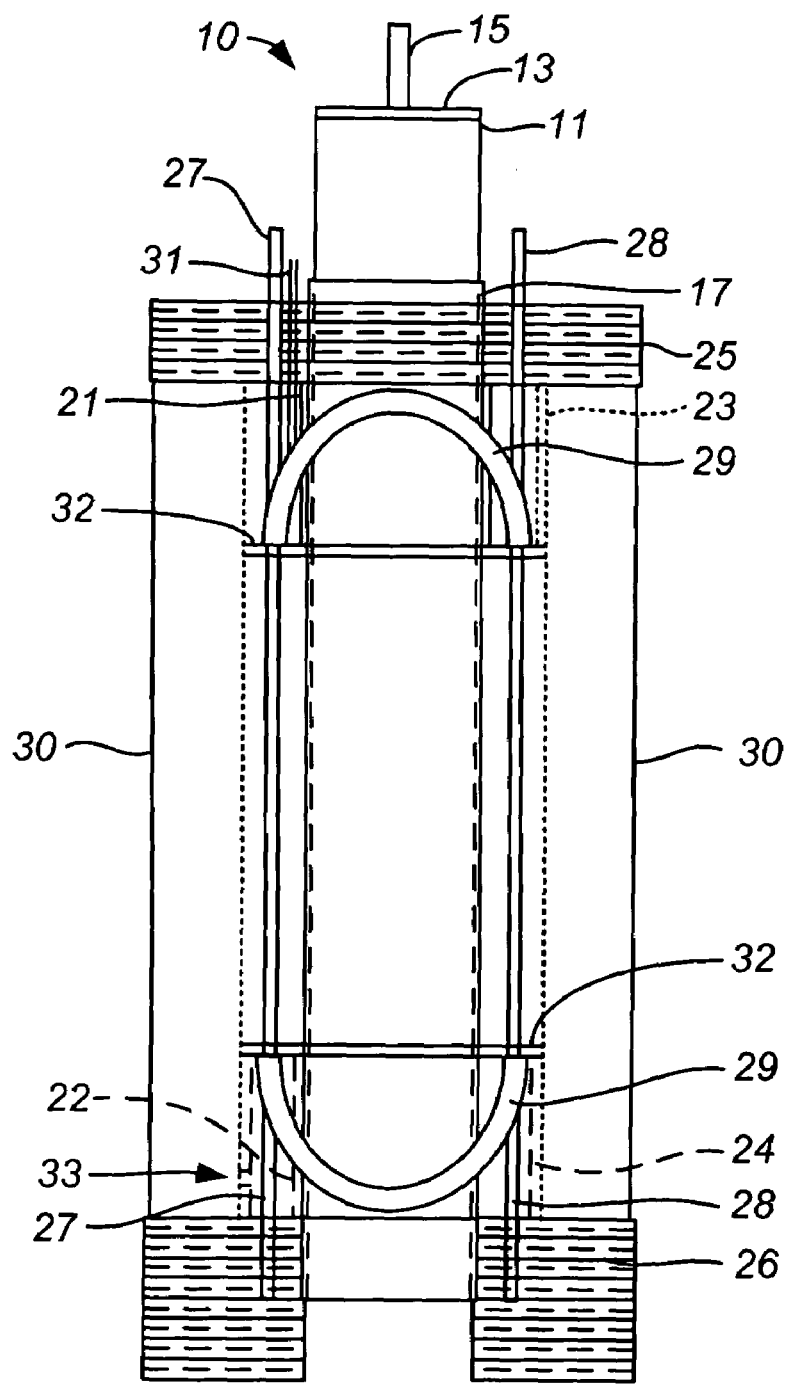
FIG. 2 is an elevation view of the resin fixture illustrated in FIG. 1 inserted into a stator for an electric motor for a pump.

With reference to FIG. 2, prior to inflating the rubber cover, the resin fixture is placed within the bore of stator 20. An inner spacer ring 21 is placed at an upper end of the stator while a second inner spacer ring 22 is placed at a lower end of the stator. Outer spacer rings 23, 24 are also placed at the upper and lower ends of the stator. Magnetic wire turns are indicated by reference numeral 29.

End plugs 25, 26 are placed at the upper and lower ends of the stator. Preferably, support bolts 27, 28 extend along the stator and couple the end plugs to one another.

In a preferred embodiment, a mold 30 is placed between the end plugs. The mold may consist of a suitable rigid material, such as, for example, metal, plastic, cement, etc. Thus, the outer spacer rings are generally located between the mold and lead wires 31 of the stator. The inner spacer rings are preferably located between the lead wires and the resin fixture within the bore. The spacer rings provide support for the end plugs so that the end plugs do not contact the stator wires. The spacer rings engage a body portion 32 of the stator and the end plugs.

Accordingly, once the entire resin fixture assembly is completed with the stator, resin is preferably pumped through a hole 33 defined within the lower outside spacer ring. Those skilled in the art will understand that the hole may be placed in the upper spacer ring if it is desired. The resin is then pumped over the stator between the mold and the inflated balloon. This allows the resin to coat the stator without filling the stator bore. The resin does not stick to the balloon due to the Teflon sheet that is preferably included over the rubber cover.

Figure 3:
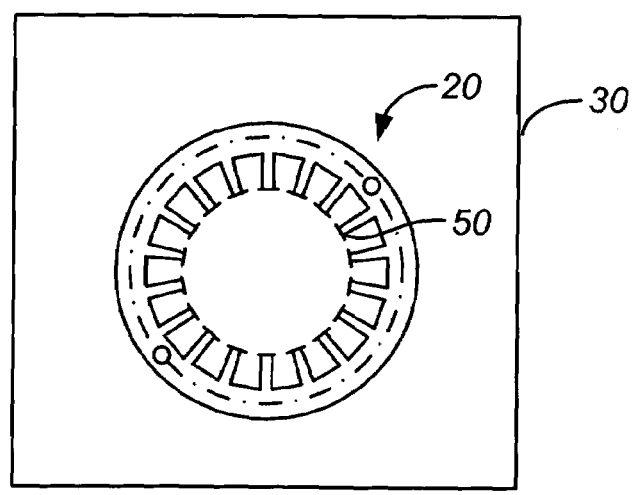
FIG. 3 is a sectional view as taken along the lines 3—3 in FIG. 2.

FIG. 3 illustrates the stator surrounded by the mold. Stator slots 50 hold magnetic wire.

In an alternative embodiment, the mold is replaced with plastic tape that is wrapped around the stator. However, this embodiment requires the addition of alignment rings that are held around the stator body adjacent the spacer rings. A clamp holds each alignment ring in place.

Preferably, the resin includes two components self-carrying liquids. The resin fills all spaces around the stator, especially the annulus created by the inside and outside spacer rings. The result is a neatly potted unit with all of the wire coils covered. Furthermore, the inner stator bore is not filled with resin.

In an alternative embodiment, resin may be poured into a reservoir at the top or bottom of the stator and then pulled or pushed into the stator using vacuum pump or a pressure pump. The vacuum pulls (or pushes) the resin from the reservoir into the annulus form by the spacer rings and into the stator slots.

While the preferred embodiments of the invention have been disclosed in detail, they should be understood by those skilled in the art that various other modifications may be made to the illustrated embodiments without departing from the scope of the invention as described in the specification and defined in the appended claims.

What is claimed is:

1. A system for insulating an electric motor stator for a pump with resin, the system comprising:
   a resin fixture for placement with the stator's bore, the resin fixture comprising:
      a tube comprising longitudinally spaced holes;
      a first plug at a first end of the tube;
      a second plug at a second end of the tube, the second plug including a valve; and
      a rubber cover over the tube;
   a first end plug at a first end of the stator and a second end plug at a second end of the stator;
   an outer cover around the stator and between the end plugs;
   a first inner spacer ring at the first end of the stator and a second inner spacer ring at the second end of the stator, the inner spacer rings being placed between lead wires of the stator and the resin fixture adjacent the first and second end plugs; and
   a first outer spacer ring at the first end of the stator and a second outer spacer ring at the second end of the stator, the outer spacer rings being placed between lead wires of the stator and the outer cover adjacent the first and second end plugs.

2. The system in accordance with claim 1 wherein the outer cover comprises plastic tape wrapped around the stator between the end plugs.

3. The system in accordance with claim 1 wherein the outer cover comprises a mold that comprises a rigid material between the end plugs.

4. The system in accordance with claim 1 wherein the tube comprises metal.

5. The system in accordance with claim 1 wherein resin is moved over the stator via a vacuum pump coupled to a hole defined in one of the outer spacer rings.

6. The system in accordance with claim 1 wherein resin is moved over the stator via a pressure pump coupled to a hole defined in one of the outer spacer rings.

7. The system in accordance with claim 1 further comprising support bolts that couple the end plugs to each other.

* * * * *